X 0009410
J. B. & W. F. Pague,
Clover Huller.
Patented Feb. 17. 1830.
Transverse Section.
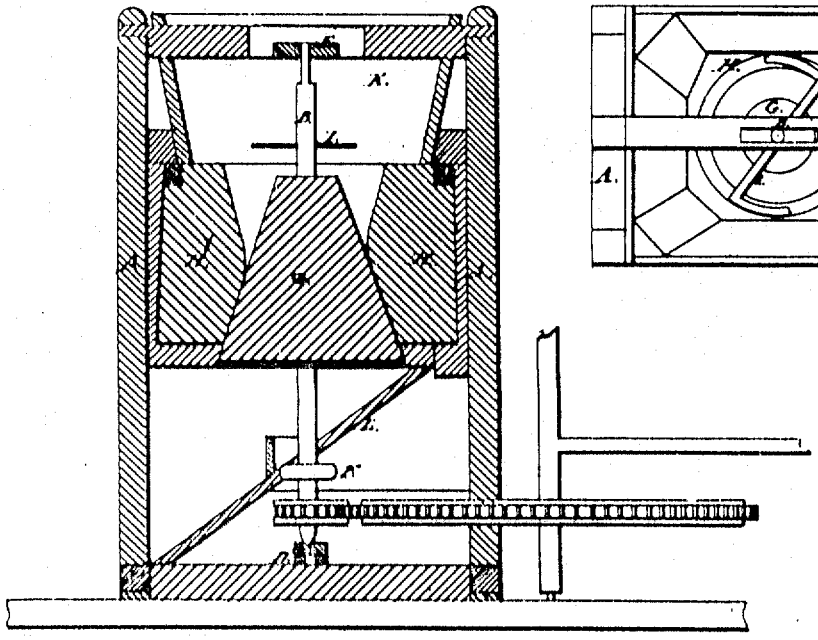
Top.
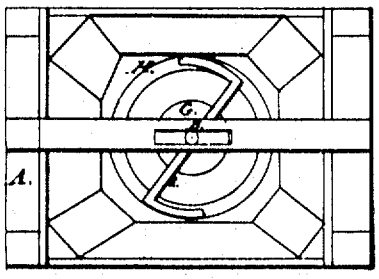
H. PETERS, PHOTO-LITHOGRAPHER, WASHINGTON, D. C.

9410X

Feb. 17, 1836

John B. Poague and William F. Poague of Virginia
Letters Patent

The Schedule referred to in these Letters Patent and making part of the same
containing a description in the words of the said John B. Poague and William F. Poague
themselves of their improvement in the Machine for hulling Clover Seed.

---

Be it known that we John B. and William F. Poague residing near Lexington in the coun
ty of Rockbridge and State of Virginia have made a new and useful improvement in
the Machine for rubbing out clover seed which is described as follows, reference being
had to the annexed drawing of the same making part of this specification. This ma
chine consists of a suitable frame A. in the centre of which is a spindle B. turning in
a step C. on a bridge tree D, its upper end turning in a box in a crosspiece E at
top having a pulley F fixed on it around which a band passes by which it is turn
ed, and on this spindle is secured a conical shaped stone runner G. turning with
in a corresponding inverted conical stone bed H. The runner and bed are dressed
or furrowed obliquely in the manner represented in the drawing. One or two
feeders I, are secured to the upper end of the spindle for feeding the machine. A
hopper K, is placed over the bed in to which the clover heads are put. An inclined
board L, is placed below the runner on which the seed and chaff are received
and conveyed to a common fan, which may be placed in front, or under the machine,
for separating the seed from the chaff. Operation the heads of clover after being
thrashed from the straw are put into the hopper from whence they descend be
tween the bed and runner. The feeders stirring and forcing them into the throat
of the machine the seed is rubbed from the hulls by the rotary motion of the runner
the stationary bed, the projections on the inside of the bed partially arresting the
hulls whilst the projections on the runner rub out the seed from them. The whole
then falls on the inclined board below, the seed being separated from the chaff by a
fan in the usual manner as before mentioned. The gearing may consist of a cog wheel
and pinion. What we claim as our invention and which we desire to secure by Let
ters Patent is the before described machine for rubbing out clover seed.

Witnesses
Ch. L. Bowyer
[illegible] M. Grigsby

John B. Poague
William F. Poague